(12) United States Patent
Zalevsky et al.

(10) Patent No.: US 11,169,176 B2
(45) Date of Patent: Nov. 9, 2021

(54) PHOTODETECTOR FOR SCANNING PROBE MICROSCOPE

(71) Applicants: Bar-Ilan University, Ramat Gan (IL); Jerusalem College of Technology (JCT), Lev Academic Center, Jerusalem (IL)

(72) Inventors: Zeev Zalevsky, Rosh HaAyin (IL); Avraham Chelly, Elad (IL); Avi Karsenty, Modiin-Macabim-Reut (IL)

(73) Assignees: JERUSALEM COLLEGE OF TECHNOLOGY (JCT), LEV ACADEMIC CENTER, Jerusalem (IL); BAR-ILAN UNIVERSITY, Ramat Gan (IL)

( * ) Notice: Subject to any disclaimer, the term of this patent is extended or adjusted under 35 U.S.C. 154(b) by 0 days.

(21) Appl. No.: 17/193,267

(22) Filed: Mar. 5, 2021

(65) Prior Publication Data
US 2021/0278435 A1    Sep. 9, 2021

Related U.S. Application Data

(60) Provisional application No. 62/985,342, filed on Mar. 5, 2020.

(51) Int. Cl.
*G01Q 60/22* (2010.01)
*G01Q 70/10* (2010.01)
*G01Q 70/06* (2010.01)

(52) U.S. Cl.
CPC ............ *G01Q 60/22* (2013.01); *G01Q 70/06* (2013.01); *G01Q 70/10* (2013.01)

(58) Field of Classification Search
CPC ......... G01Q 60/22; G01Q 70/06; G01Q 70/10
(Continued)

(56) References Cited

U.S. PATENT DOCUMENTS

| 5,923,033 A * | 7/1999 | Takayama | .............. | B82Y 35/00 |
| | | | | 250/234 |
| 6,852,968 B1 * | 2/2005 | Ouchi | .................... | G01Q 60/22 |
| | | | | 250/234 |

(Continued)

OTHER PUBLICATIONS

Arora, et al.. Design of Mems Based Microcantilever Using Comsol Multiphysics, International Journal of Applied Engineering Research, 2012, pp. 1-3, vol. 7, No. 11.

(Continued)

*Primary Examiner* — Nicole M Ippolito
(74) *Attorney, Agent, or Firm* — Browdy and Neimark, PLLC

(57) ABSTRACT

A detector device is presented for use in a surface probing system. The detector device comprises an integral semiconductor structure configured to define a cantilever and tip probe assembly, comprising at least one tip formed on the cantilever, wherein an apex portion of said at least one tip is configured as an apertured photodetector comprising a layered structure formed with an aperture of subwavelength dimensions and defining at least one depletion region and an electrical circuit, said subwavelength aperture allowing collection of evanescent waves created at a surface region and interaction of collected evanescent waves with the at least one depletion region thereby causing direct conversion of the collected evanescent waves into electric signals being read by the electrical circuit within said tip apex portion, said integral semiconductor structure being thereby capable of concurrently monitoring topographic and optical properties of the surface being scanned by the tip.

19 Claims, 15 Drawing Sheets

(58) Field of Classification Search
USPC ......... 850/21, 24, 30, 31, 40, 41, 42, 56, 57
See application file for complete search history.

(56) References Cited

U.S. PATENT DOCUMENTS

| | | | | |
|---|---|---|---|---|
| 2008/0049236 A1* | 2/2008 | Iyoki | ................ | G01Q 20/02 |
| | | | | 356/614 |
| 2012/0307605 A1* | 12/2012 | Zhang | ................ | G11B 5/455 |
| | | | | 369/13.32 |
| 2017/0102407 A1* | 4/2017 | Baur | ................ | G01Q 10/06 |

OTHER PUBLICATIONS

Bruker AFM Probes, www.brukerafmprobes.com/p-3897-fesp-v2.aspx, accessed Mar. 16, 2021.
Chen, et al., Research on Double-Probe, Double- and Triple-Tip Effects during Atomic Force Microscopy Scanning, Scanning, 2004, pp. 155-161, vol. 26.
Chiou, et al., Multi Tips Atomic Force Microscopy for Dynamic Nanomovement Detection, Transducers 2015, Anchorage, Alaska, Jun. 21-25, 2015, pp. 1413-1416.
Ntroduction to COMSOL Multiphysics, www.comsol.com/, 2019, pp. 1-214.
Karelits, et al., Electro-optical study of nanoscale Al—Si-truncated conical photodetector with subwavelength aperture, Journal of Nanophotonics, Oct.-Dec. 2017, p. 046021-1-046021-13, vol. 11(4).
Karsenty, et al., Computer algebra in nanotechnology: Modelling of Nano Electro-Optic Devices using Finite Element Method (FEM), Proceeding of ACA 2017 23rd Conference on Applications of Computer Algebra, Session 6 Computer Algebra for Applied Physics, Jul. 17-21, 2017, p. 138.
Karsenty, et al., Computer Algebra Challenges in Nanotechnology: Accurate Modeling of Nanoscale Electro-optic Devices Using Finite Elements Method, Math. Comput. Sci., 2019, pp. 117-130, 13(1-2).
Lu, et al., Tip-enhanced infrared nanospectroscopy via molecular expansion force detection, Nature Photonics, Apr. 2014, pp. 307-312, vol. 8, No. 4.
Stern, et al., Near field phase mapping exploiting intrinsic oscillations of aperture NSOM probe, Optics Express, 2011, p. 12014-12020, vol. 19, No. 13.
Zhao, et al., Localized Current Injection and Submicron Organic Light-Emitting Device on a Pyramidal Atomic Force Microscopy Tip, 2007, pp. 3645-3649, vol. 7, No. 12.

* cited by examiner

| Step number and name | Step parameters | Steps' process flow |
|---|---|---|
| 1. Commercial Si-based AFM tips preparation | • Type: $n^+$<br>• Doping: As $<10^{17}$ cm$^{-3}$ | 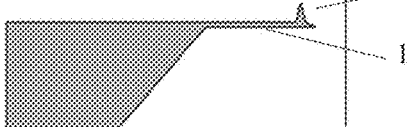 16, 14 |
| 2. Atomic Layer Deposition | • Layer: $Al_2O_3$<br>• Thickness: 50 nm<br>• Function: Insulator | 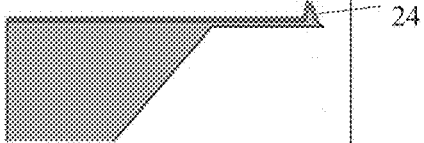 24 |
| 3. Sputtering deposition of reflective and conductive layer | • Layer: Aluminum<br>• Thickness: 200 nm<br>• Function: Top contact (Anode) | 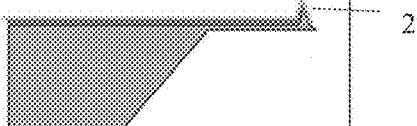 22 |
| 4. FIB ablation of the tip | • Initial Si aperture diameter: 100 nm |  |
| 5. In-situ FIB deposition | • Layer: Platinum<br>• Thickness: 200 nm<br>• Function: Schottky contact to Silicon |  26 |
| 6. In-situ FIB drilling | • Final Aperture diameter of the detector: <100 nm<br>• Depth > 200 nm | 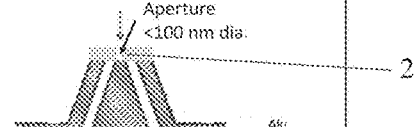 22 |

FIG. 6

PHOTODETECTOR FOR SCANNING PROBE MICROSCOPE

TECHNOLOGICAL FIELD

The present invention is in the field of scanning probe microscopy (SPM) and relates to a tip-photodetector for use in SPM.

BACKGROUND ART

References considered to be relevant as background to the presently disclosed subject matter are listed below:
References considered to be relevant as background to the presently disclosed subject matter are listed below:
1. F. Lu, M. Jin and M. A. Belkin, "Tip-enhanced infrared nanospectroscopy via molecular expansion force detection," *Nature Photonics*, Vol. 8, No. 4, pp. 307-312, April 2014.
2. L. Stern, B. Desiatov, I. Goykhman, G. M. Lerman, and U. Levy., "Near field phase mapping exploiting intrinsic oscillations of aperture NSOM probe", *Optics Express*, vol. 19, no. 13, pp. 12014-12020, June 2011.
3. S. Arora, Sumati, A. Arora, P. J. George, "Design Of Mems Based Microcantilever Using Comsol Multiphysics", *International Journal of Applied Engineering Research*, Vol. 7, No. 11, January 2012.
4. Y. Zhao, K. H. An, S. Chen, B. O'Connor, K. P. Pipe, and M. Shtein, "Localized Current Injection and Submicron Organic Light-Emitting Device on a Pyramidal Atomic Force Microscopy Tip", *Nano Letters*, Vol. 7, No. 12, pp. 3645-3649, 2007.
5. Comsol Multi-Physics Software Package, https://www.comsol.com/.
6. Karsenty A.; Mandelbaum Y. Computer Algebra Challenges in Nanotechnology: Accurate Modeling of nanoscale electro-optic devices using Finite Elements Method. Mathematics in Computer Science 2019, 13(1-2), 117-130.
7. Karsenty A., Mandelbaum Y. Computer algebra in nanotechnology: Modeling of Nano Electro-Optic Devices using Finite Element Method (FEM). Proceeding of ACA 2017 23rd Conference on Applications of Computer Algebra, Session 6: Computer Algebra for Applied Physics 2017, Jerusalem, Jul. 17-21, 2017, p. 138.
8. Karelits M.; Mandelbaum Y.; Chelly A.; Karsenty A. Electro-Optical Study of Nanoscale Al—Si Truncated Conical Photodetector with Subwavelength Aperture. Journal of Nanophotonics 2017, 11(4), 046021-1-046021-13.
9. Bruker AFM Probes, www.brukerafmprobes.com/p-3897-fesp-v2.aspx
10. Chiou Y. K.; Chang J. M.; Chen Y. C.; Tseng F. G.; Wang P. C. Multi Atomic Force Tips Microscopy For Dynamic Nano-movement Detection. IEEE Transducers Conference 2015, Anchorage, Ak., USA, Jun. 21-25, 2015, pp. 1413-1416.
11. Chen Y.; Cai J.; Liu M.; Zeng G.; Feng Q.; Chen Z. Research on Double-Probe, Double- and Triple-Tip Effects during Atomic Force Microscopy Scanning. Scanning 2004, 26(4), 155-161.

Acknowledgement of the above references herein is not to be inferred as meaning that these are in any way relevant to the patentability of the presently disclosed subject matter.

BACKGROUND

The core method of Scanning Probe Microscopy (SPM) enabling nanometric surface morphology characterization is Atomic Force Microscopy (AFM). On the other side, Near Field Scanning Optical Microscopy (NSOM) is an optical method for sub-diffractive optical characterization, for instance for characterizing fluorescence or electroluminescence of nanoscale structures. Both methods AFM and NSOM are crucial for many fields of science, technology and industry. Each of these methods is widely used for nanoscale study and characterization of new nanomaterial components, life science and biological objects, semiconductor and electronic metrology, photonics, plasmonics, differential NSOM, and more. Each of AFM and NSOM techniques has progressed since the last decades, when each one of them brings solid advantages.

Moreover, significant progress was recently observed with the manufacture of new tips using processed methods [1, 2], and the simulation of new tip designs for future manufacture [3]. Combining Organic Light-Emitting Devices (OLEDs) with micro-machined silicon cantilevers was also studied [4].

GENERAL DESCRIPTION

There is a need in the art for a novel approach for surface probing in microscopy.

Growing need for conducting research studies on various biological and non-biological aspects for developing innovative solutions has led manufacturers to seek for equipment integrating leading technological features. In addition, increasing demand for the technologically equipped microscopes in various educational institutions continue to increase attributed to the growing need for imparting in-depth information and knowledge. Surge in the production of various electronic products has led to increasing demand for atomic force microscopes in the global market.

The present invention provides a novel SPM detector device combining the principles of two measurement capabilities, AFM and NSOM, into one dual-mode photodetection based on a semiconductor (typically silicon) tip. Such a combined detector device enables a dual-mode usage of both AFM and NSOM measurements, when collecting light reflection directly from the scanned surface while having a more efficient light collection process.

The new detector device of the present invention includes a cantilever- and tip structure modified according to the invention such that an apex region of the tip (by which it faces a sample being probed/inspected) is configured as a photodetector. More specifically, the apex region of the tip is configured as a layered structure defining a photodetector (e.g., metal-oxide-semiconductor (MOS) photodiode) and electrical contacts, and an optical window (sub-wavelength aperture) at the tip edge thereby exposing a light conversion region of the photodetector to input light collected via the aperture. As a result, the input light signal is directly converted to electrical signal which is read out by the electrical circuit within the modified cantilever-and-tip structure.

For example, such a tip-photodetector of the present invention may be configured as a Platinum-Silicon truncated conical structure with a subwavelength aperture. Such a photodetector structure is formed on a silicon cantilever (e.g., commercial cantilever, using known suitable nanotechnology tools).

The inventors have simulated, fabricated and measured the integration of a NSOM tip-photodetector operating in the visible domain of wavelengths into an AFM cantilever.

Some of the main advantages of such AFM-NSOM dual-mode concept includes the following features: Dual-mode in one tip, usage of standard commercial starting material, multi-functionality, energetic efficiency, light acquisition at the surface of the sample, and good SNR (Signal to Noise Ratio). In addition to its quite simple fabrication process, formation of the photodetector on the AFM tip does not alter the AFM imaging capability. The results of the AFM-NSOM capability of the processed tip have shown a significant improvement in surface characterization accuracy and efficiency.

Thus, according to one broad aspect of the invention, there is provided a detector device for use in a surface probing system, the detector device comprising an integral semiconductor structure configured to define a cantilever and tip probe assembly, comprising at least one tip formed on the cantilever, wherein an apex portion of said at least one tip, by which the probe assembly scans a surface being probed, is configured as an apertured photodetector comprising a layered structure formed with an aperture of subwavelength dimensions and defining at least one depletion region and an electrical circuit, said subwavelength aperture allowing collection of evanescent waves created at a surface region in response to external illumination and interaction of collected evanescent waves with the at least one depletion region thereby causing direct conversion of the collected evanescent waves into electric signals being read by the electrical circuit within said apex portion of the tip, said integral semiconductor structure being thereby configured and operable for concurrently monitoring topographic and optical properties of the surface being scanned by said apex portion of the tip.

The electric circuit defined by the layered structure comprises electric contact layers extending from the apex portion of the tip along a surface of the cantilever and tip probe assembly to be received at a signal detector.

The cantilever and tip probe assembly is made of semiconductor material, and the layered structure is configured as a metal-oxide-semiconductor (MOS) structure defining at least one MOS unit and an electrical contact layer.

The apertured photodetector may be fabricated at the apex portion of the tip made of semiconductor material, by the following processing:

performing Atomic Layer Deposition of a passivation layer on a portion of said apex region of the tip, depositing by sputtering reflective and conductive layer on said passivation layer, applying FIB processing to said portion of the apex region of the tip to deposit electrically conductive opaque layer and form the aperture in the semiconductor material.

In some embodiments, the passivation layer is $Al_2O_3$ (e.g., having a thickness of about 50 nm), the reflective and conductive layer is Al (e.g., having a thickness of about 200 nm), and the electrically conductive opaque layer is platinum (e.g., having a thickness of about 100 nm). The aperture may have a dimension less than 100 nm.

The FIB processing may include ablation of the tip to form an initial silicon aperture size of 100 nm, followed by the deposition of the platinum opaque layer; and drilling to define the silicon aperture of a dimension less than 100 nm.

In some embodiments, the cantilever and tip probe assembly comprises at least one additional tip on the same cantilever. For example, the at least one additional tip may be configured for monitoring topographic properties of the surface being scanned. Alternatively or additionally, the apex regions of the at least two tips on the cantilever may be formed with the apertured photodetectors configured for collection and detection of light of different wavelengths, respectively, the detector device thereby having spectrometer functionality.

In some embodiments, the aperture may be of elongated geometry and may thus operate as a polarizer.

In some embodiments, the cantilever and tip assembly is configured to detect different polarization components of the evanescent waves being collected, thereby providing polarimeter functionality to the detector device. This may be implemented by configuration of the layered structure in which the metal layer (on insulator) is patterned to define four spaced-apart electrically conductive segments, thereby forming four depletion regions for polarized detection and four electric signal read channels. This enables measurement of angles of rotation of polarized illuminating light caused by interaction with the surface being scanned.

According to another broad aspect of the invention, it provides an AFM-NSOM dual-mode detector device comprising: an integral semiconductor structure configured to define a cantilever and tip assembly comprising at least one tip configured and operable as an AFM probe for monitoring topography properties of a surface being scanned by the tip, wherein an apex portion of said at least one tip is configured as an apertured photodetector having a metal-oxide-semiconductor layered structure formed with an aperture of a subwavelength dimensions adapted to collect evanescent waves created at a surface region in response to external illumination and directly convert collected evanescent waves into electric signals being read by an electrical circuit within the apex portion of the tip, said apex region of the tip being thereby configured and operable as an NSOM probe, while maintaining the cantilever and tip assembly operation as the AFM probe.

The invention in yet further broad aspect provides a surface probing system comprising: a light source unit configured and operable to produce pulsed illumination on a surface being scanned; and a detector device comprising an integral semiconductor structure configured to define a cantilever and tip probe assembly, comprising at least one tip formed on the cantilever, wherein an apex portion of said at least one tip is configured as an apertured photodetector comprising a metal-oxide-semiconductor layered structure formed with an aperture of subwavelength dimensions allowing collection of evanescent waves created at a surface region in response to the pulsed illumination and direct conversion of the collected evanescent waves into electric signals being read by an electrical circuit within said apex portion of the tip, said integral semiconductor structure being thereby configured and operable for concurrently monitoring topographic and optical properties of the surface being scanned by said apex portion of the tip.

The invention also provides a method for fabricating the above-described detector device, the method comprising: providing the cantilever and tip probe assembly made of silicon material; and processing the apex region of the tip to form said apertured photodetector, said processing comprising: performing Atomic Layer Deposition of a passivation layer on a portion of said apex region of the tip, depositing reflective and conductive layer on said passivation layer, and applying FIB processing to said portion of the apex region of the tip to deposit electrically conductive opaque layer and form the aperture in the semiconductor material.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIGS. 4a-4d and 5a-5b illustrate the simulations conducted by the inventors for simulating the performance of the detector device of the present invention, wherein: FIGS. 4a-4d show comsol structure and mesh simulation results of the tip-photodetector for simulated regular mesh used for external contacts (FIG. 4a), simulated accurate mesh used for upper inside aperture (FIG. 4b), simulated accurate mesh used for internal drilled cylinder of the photodetector (FIG. 4c), and zoom-in of the aperture, sharing a diameter of 150 nm only less than the visible wavelength, and of the internal drilled cylinder (FIG. 4d); and FIGS. 5a-5b show comsol electrical simulation results of the tip-photodetector expressed by volume log of the electron concentration [$cm^{-3}$ units](FIG. 5a), and multi-slice log of the electron concentration [$cm^{-3}$ units] (FIG. 5b);

FIG. 6 exemplifies a flow diagram of the process of the invention for fabricating AFM-NSOM dual-mode detector device, where the NSOM detector functionality is formed by processing the apex region of an AFM tip;

FIGS. 7a and 7b illustrate the profile and dimensions of the commercial cantilever and commercial tip, wherein FIG. 7a shows down side view of the cantilever and of the tip, and FIG. 7b shows up side and close-up view of the processed tip;

FIGS. 8a and 8b exemplify some stages of the fabrication process of the dual-mode AFM-NSOM detector device of the invention, wherein FIG. 8a shows the SEM view of the tip region using the FIB system after tip's ablation and FIG. 8b shows the SEM view of the tip region using the FIB system after Platinum deposition;

FIGS. 9a and 9b exemplify processing of a series of three tips, while varying the diameters in a range of tens of nanometers, wherein FIG. 9a shows SEM pictures of two AFM tips after drilling, illustrating pre-Platinum deposition view of a tip contact diameter of 195 nm and aperture diameter of 100 nm, and FIG. 9b shows SEM pictures of two AFM tips after drilling illustrating the post-Platinum deposition view of a tip contact diameter of ~400 nm and aperture diameter of 68.7 nm;

FIGS. 12a-12f and 13a-13f illustrate advanced AFM scans of nano Si tips using, respectively, regular AFM tip and processed tip, wherein FIGS. 12a and 12a show pre-scan sample at α=0°; FIGS. 13b and 13b show pre-scan sample rotated at α=90°, FIGS. 12c and 12c show horizontal scan view at α=0°, FIGS. 13d and 13d illustrate vertical scan views at α=0°, FIGS. 12e and 12e illustrate horizontal scan views at α=90°, and FIGS. 13f and 13f illustrate vertical scan views at α=90°.

DETAILED DESCRIPTION OF EMBODIMENTS

Figure 1A:
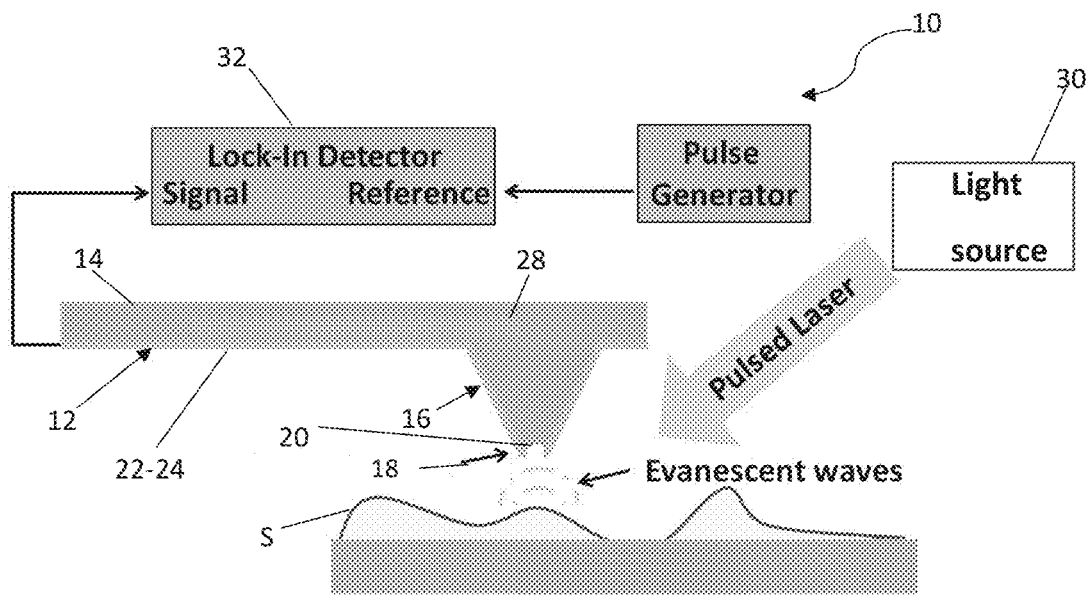
FIG. 1A is a schematic illustration of a surface probing system utilizing an AFM-NSOM dual-mode detector device of the present invention.
Figure 1B:
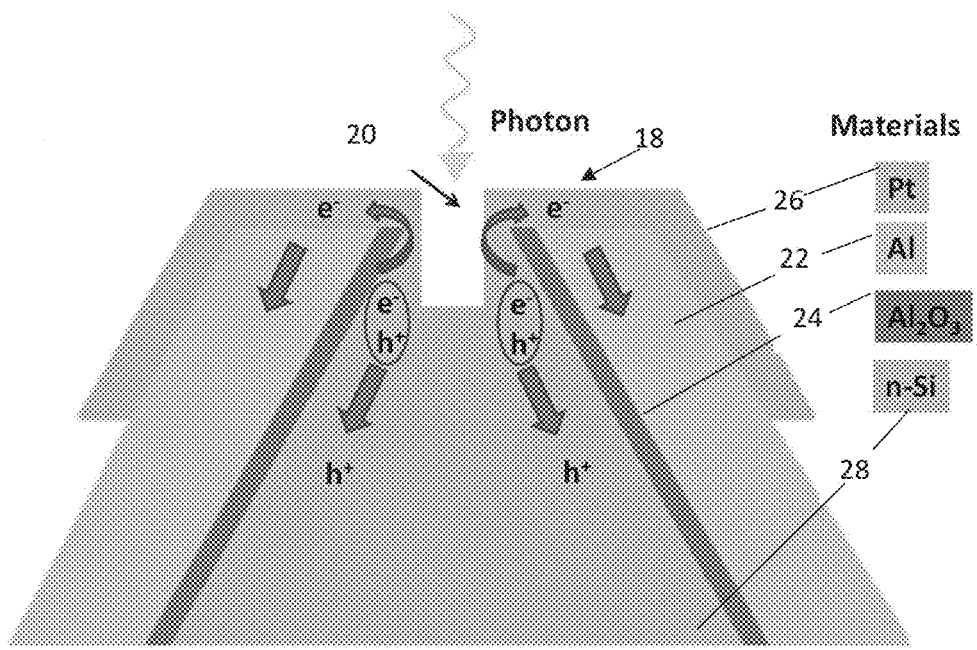
FIG. 1B schematically illustrates the configuration of an NSOM structure implemented within the apex part of an AFM tip, according to the invention.

The present invention provides a novel detection device combining mechanical and optical functionalities of, respectively. AFM and NSOM detection modes in a common detector structure. Reference is made to FIGS. 1A-1B which schematically illustrate the configuration and operation of a surface probing system 10 (detection system) utilizing an AFM-NSOM dual-mode detector unit 12 of the present invention.

In the description below, the NSOM dual-mode detector unit 12 is exemplified as being fabricated by processing an apex region of an AFM silicon tip and is therefore at times termed as "processed tip" or "tip-photodetector".

FIG. 1A shows implementation of the concept of the AFM-NSOM coupled device in the configuration of the detector unit 12; and FIG. 1B demonstrates the concept of the processed tip structure of the detector unit 12 and photo-current generation.

As shown in the figures, the detector unit 12 is configured as a modified cantilever-and-tip structure, which is generally similar to that commonly used in AFM, but modified by configuring an apex part/region 18 of a silicon tip 16 (a "probing part" of detection system) on the cantilever to define a truncated apertured (drilled) photodetector element. To this end, as shown in FIG. 1B, the apex region 18 of the semiconductor (silicon) tip 16 is processed to form a layered structure defining a depletion region of electron-pair generation in response to absorbed photons and electrical contacts and to form a small (subwavelength) optical window 20 (e.g., aperture) at the tip edge.

The depletion region may, generally, be formed by doping of silicon. Preferably, however, the layered structure of the apertured photodetector is configured generally similar to metal-oxide-semiconductor (MOS) photodiode, having a narrow (small) depletion region corresponding to the photon penetration depth, defined by the metal-semiconductor interface.

As also shown in FIG. 1A, a layered structure of one of the electrical contacts of the photodetector element (layers 22-24) extends, as a surface coating, from the tip apex 18 along the silicon cantilever 14. This configuration of the processed tip apex 18 enables direct collection of an input light field (via aperture 20), conversion of the collected light field into electrical signal and read out of the electric signal via the electric contacts.

As shown in FIG. 1A, the sample is illuminated with light (from the top or bottom) produced by an external light source 30, e.g., pulsed laser. The photodetector 18 collects a light response of an illuminated region of the sample's surface via the aperture 20 operating as a light collecting element, and this light response is directly converted into an electric current.

As shown in an example of FIG. 1B, the tip apex portion 18 is processed to define the aperture 20 and a MOS layered structure including a thin passivation layer 24, a reflective and electrically conductive layer 24, and further formation of electric contact—a conductive opaque layer 26. For example, the silicon aperture 20 has a dimension (diameter) substantially not exceeding 100 nm, the passivation layer 22, which may be $Al_2O_3$, has a thickness of about 50 nm thick, the reflective and conductive layer (e.g., Al) is about 200 nm thick, and the conductive opaque layer is platinum having thickness of about 100 nm. It should be noted that the layer coating is applied only to a part (half) of the tip periphery to avoid electronic shortage. The fabrication of the drilled photodetector will be exemplified further below with reference to FIG. 6.

The detector unit 12 configured as described above provides an AFM-NSOM coupled device, in which the entire unit 12 maintains AFM functionality (due to cantilever-and-tip structure), and at the same time its small distal part 18 presents the apertured (drilled) photodetector in its complete functionality, i.e., light field collection, conversion to electric signal and signal read out. Thus, according to the invention, the NSOM and AFM functionalities are integrated in the same modified cantilever-and-tip structure. The AFM functionality can be adjusted by properly designing the mechanical responsivity of the tip. The NSOM functionality of near field imaging can be obtained according to the size of the photodetector on the tip, its responsivity and a distance from the aperture 20 to the inspected surface S. The dual-mode AFM-NSOM detector unit of the present invention is advantageous in the light collection process, which is directly performed from the surface of the sample. As shown in FIG. 1A, a detector circuit 32 may utilize lock-in amplifier to detect small current signals (in the pA range).

As generally known, in convention NSOM technology, excitation laser light is focused through a fiber aperture of a dimension smaller than the excitation wavelength, creating an evanescent field (near-field) on the aperture. When the sample is scanned at a small distance between the fiber aperture and the sample, optical resolution of a light response (transmitted or reflected light) of the sample is limited only by the dimension (diameter) of the aperture. As for convention AFM technology, deflection (displacement with respect to the equilibrium position) of the cantilever, resulting from forces that the sample imposes on AFM tip, is converted into an electrical signal, whose intensity is proportional to the displacement of the cantilever.

The inventors have shown that modifying/processing a commercial silicon tip in order to fabricate a drilled (apertured) light sensitive photodetector at the tip apex region 18, results in the reduced tip 16 which continues to behave as an AFM probe, meaning that the contact surface of the tip remains small enough in order to scan the sample's surface with good resolution.

Figure 1C:
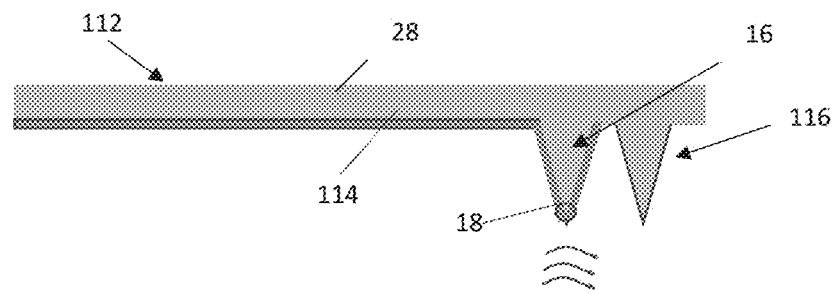
FIG. 1C schematically illustrates an example of the AFM-NSOM dual-mode detector device according to some embodiments of the invention.

In some embodiments, e.g., in order to improve the resolution, multiple tips on the same cantilever could also be designed, wherein at least one tip is configured to be dedicated to regular AFM scanning functionality and resolution, and at least one other tip is modified as described above to be dedicated to the detection of the light reflected from the sample with different angles enabling NSOM functionality. This is schematically illustrated in FIG. 1C showing a modified cantilever-and-tip structure 112, in which two tips 16 and 16' are made on the same cantilever 14, where tip 16' is a regular AFM tip, and tip 16 is a modified tip the apex region of which is configured as a photodetector 18 as described above.

The NSOM functionality is well known and has four operational modes: (i) transmission mode imaging, in which a sample is illuminated through a probe, and light passing through the sample is collected and detected; (ii) reflection mode imaging, in which a sample is illuminated through a probe, and light reflected from the sample surface is collected and detected; (iii) collection mode imaging, in which a sample is illuminated with a macroscopic light source from the top or bottom, and the probe is used to collect the light from the sample's surface (this mode is used in the dual-mode detector of the present invention); and (iv) illumination/collection mode imaging, in which the probe is used for both the illumination of the sample and for the collection of the sample's response signal.

Generally, detecting the collected light can be achieved with a wide variety of instruments: an Avalanche Photo Diode (APD), a Photo-Multiplier Tube (PMT), a CCD, or a spectrometer. The signals obtained by these detectors can then be used to create an NSOM image of the surface. The use of any of these techniques in the combined system (i.e. AFM and NSOM functionalities in the same cantilever-and-tip configuration), on the one hand, results in the decrease in the AFM resolution (since the tip is ablated), but on the other hand provides for increasing the resolution of the NSOM (since the tip's aperture can be well below the optical wavelength).

In some embodiments, the detection system is further configured for performing polarization-based measurements. In this regard, reference is made to FIGS. 2A-2D exemplifying various features of such polarization-based measurement/inspection technique. To facilitate understanding, the same reference numbers are used to identify functionally similar units in all the examples.

Figures 2A, 2B:
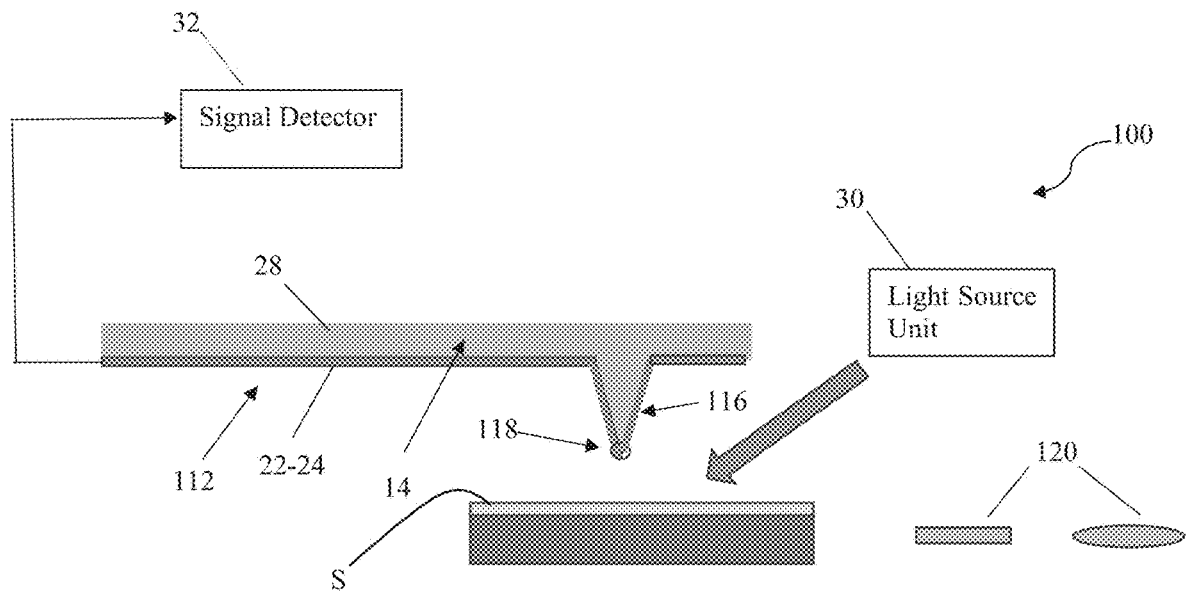
FIGS. 2A and 2B exemplify a detection system of the invention in which the tip-photodetector is further configured as a polarizer.

FIG. 2A exemplifies a system 100 which is configured generally similar to the above-described system 10, namely includes a light source 30, a signal detector 32, and a modified cantilever-and-tip structure 112 generating the electric signals indicative of both topographic and optical properties of a surface being scanned. In this example, the structure 112 utilizes a polarization sensitive tip 116. This can be implemented by configuring a subwavelength aperture 120 of the photodetector 118 at the tip apex region elongated in one dimension (rectangular or oval like), as shown in FIG. 2B. The photodetector 118 thus operates also as a polarizer. This may be useful when operating with polarized illumination in order to increase signal-to-noise of optical detection, or when the inspected surface has polarization sensitive information that one aims to extract/detect.

Figures 2C, 2D:
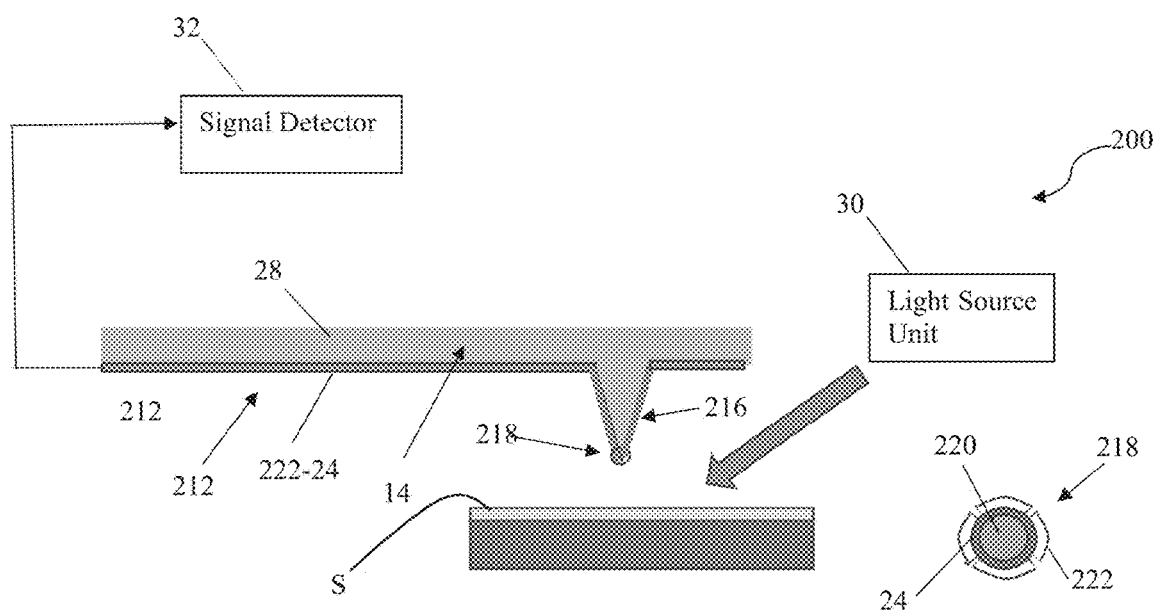
FIGS. 2C-2D exemplify a detection system of the invention in which the tip-photodetector is further configured as a polarimeter.

FIG. 2C exemplifies a system 200 which utilizes the principles of the present invention and is configured and operable as a polarimeter to measure the angle of rotation caused by passing polarized light through an optically active substance. Polarized light becomes rotated (counterclockwise or clockwise), when interacting with an optically active substance. The amount by which the light is rotated (the angle of rotation) is proportional to the concentration of the optically active substances in a sample. The system 200 may therefore be used for measuring concentration of the optically active substance in the sample measurements, or as a sensor to identify a foreign substance in a sample.

The system 200 includes a light source unit 30, a signal detector 32, and a cantilever-and-tip detection device 212. In this embodiment, the cantilever-and-tip detection device 212 includes a tip-photodetector structure 218 implemented in an apex region of a tip 216 on cantilever 14 which is configured to define four polarized detection channels in order to implement the complete polarimeter requiring signal read out and analysis using four Stokes parameters/coefficients. It should be noted that, generally, the tip-photodetector structure may generally be implemented using four respective tips on the same cantilever with polarization sensitive apertures. Preferably, however, the polarimeter functionality can be implemented within the apex region 218 of same tip 16.

The configuration of such four-channel apertured photodetector 218 is shown schematically in FIG. 2D. The photodetector 218 includes a light collection aperture 20 allowing input photon incidence onto a semiconductor (silicon) 28 of the tip material, and a layered structure which allows conversion of the incident light into electric current and divides the signal read circuit into four channels. The layered structure includes an insulating layer (e.g., $Al_2O_3$) 24 and a patterned reflective and electrically conductive layer 222 in the form of four spaced-apart segments of the reflective and electrically conductive regions. Also, although not specifically shown here, an opaque electric contact layer (26 in FIG. 1B) is formed on the entire structure. This configuration of the layered structure defines four MOS diodes and four respective depletion regions and four readout channels, all linked to the same single aperture.

The general principles of optical signals collection and read out in a polarimeter using Stokes parameters are known per se and therefore need not be specifically described, except to note that Stokes parameters describe polarization state of electromagnetic radiation and are used to construct the Stokes vector for the input light to determine the effect of an optical system (light interaction with a sample) on the polarization of light being collected. Via sensing Stocks parameters one can not only sense the polarization state and its location on Poincare sphere but also know degree of polarization for the collected radiation.

Figure 3:
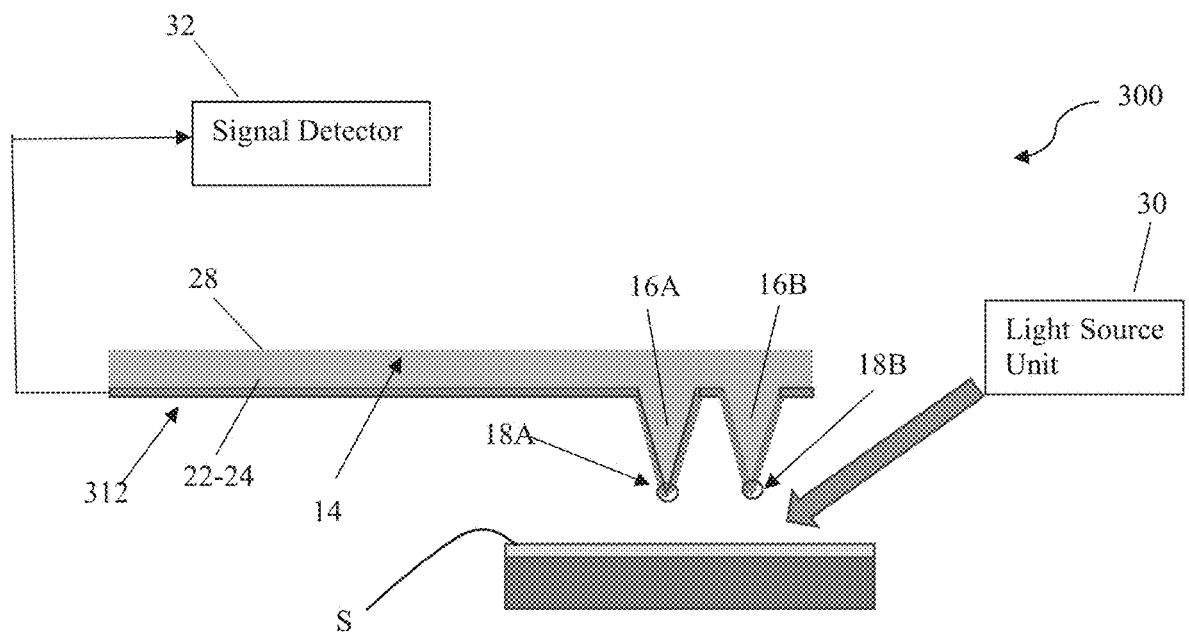
FIG. 3 exemplifies a detection system of the invention configured as a spectrometer.

Reference is now made to FIG. 3, exemplifying a detection system 300 according to yet another embodiment of the invention, configured to operate as a spectrometer (e.g., in addition to surface topography). The system 300 is configured generally similar to the above-described example of FIGS. 1A and 1B, namely includes a light source unit 30, a signal detector 32, and a detector device 312 utilizing a cantilever-and-tip structure. In this embodiment, the cantilever-and-tip structure 312 includes two or more tip-photodetectors—two such tip-photodetectors 18A and 18B being shown in this specific not limiting example, implemented in respective tips 16A and 16B located on the same cantilever 14. The multiple tip-photodetectors are configured for collection and detection of different wavelengths (spectral ranges) respectively, which may be implemented by properly designing the dimensions of the apertures and/or by adding specific wavelength sensitive coatings on top of the tip.

As mentioned above, the main advantage of the NSOM-AFM dual mode detector device 12 is related to the capability of the device to enable both multi-functionality in one device, and also to have increased energetic collection efficiency (due to the fact that reflected light is directly converted to intensity readout at the tip and does not have to be coupled and guided through a collection fiber as done in the case of conventional NSOM system. The probing system utilizing the NSOM-AFM dual mode detector device enables both mechanical AFM surface scan and topography with the light collection through a very sensitive silicon-based photodetector. Such system enables crossing information of mechanical and optical results during the samples' scanning process, and thorough and more accurate analysis of the observed results.

Since the collected evanescent waves are converted to an electrical read out directly on the tip, and do not need to be coupled to a fiber and be guided to a remote detector, a higher signal, higher SNR, and eventually higher resolution can be obtained (as resolution is directly related to SNR).

Indeed, mathematically, the coupling efficiency into a fiber tip depends on geometric efficiency $\eta_{geo}$, angular efficiency $\eta_{angle}$, and Fresnel efficiency $\eta_{Fresnel}$.

More specifically, the geometric efficiency is determined as:

$$\eta_{geo} = \frac{A_{fiber}}{A_{scatterer}} \quad (1)$$

where $A_{fiber}$ is the light collecting area of the fiber tip, and $A_{scatterer}$ is the area of the scatterer in the sample from which the light is back scattered in response to illumination and which is to be collected into the fiber tip.

The angular efficiency is determined as:

$$\eta_{angle} = \frac{NA^2}{\theta_{scatterer}^2} \quad (2)$$

where NA is the numerical aperture of the fiber and $\theta_{scatterer}$ is the angular scattering of the scatterer. This angle is proportional to:

$$\theta_{scatterer}^2 \propto \frac{\lambda^2}{A_{scatterer}} \quad (3)$$

where $\lambda$ is the wavelength. Since subwavelength spatial features are to be sensed, $\theta_{scatterer}$ is approaching a hemisphere.

The refraction index of the fiber tip is different from the medium in which the back scatterer radiation is propagating. The power reflectance at normal incidence (keeping in mind that the refraction index of the fiber tip, $n_{fiber}$, is different from the medium in which the back scatterer radiation is propagating) is given by:

$$R = \left(\frac{n_{fiber} - 1}{n_{fiber} + 1}\right)^2 \quad (4)$$

The Fresnel factor for coupling efficiency is approximately equal to:

$$\eta_{Fresnel} = 1 - R \quad (5)$$

The overall efficiency of the light collection process thus equals to:

$$\eta_{total} = \eta_{geo} \eta_{angle} \eta_{Fresnel} \quad (6)$$

It should be noted that the evanescent component of the electrical field has similar expressions for the collection efficiency. However, the intensity of the electrical field that interacts with the fiber tip is exponentially decayed with the distance between the scatterer and the fiber tip. The Fourier transform of the intensity is given by:

$$I_y(\mu, z) = I_y(\mu, 0) \exp\left(-2\pi \sqrt{\mu^2 - \frac{1}{\lambda^2}}\right) z, \quad (1)$$

where µ is the spatial frequency and µ>1/λ for the evanescent component, and this decaying reduction in power needs to be taken into account as well, since less energy arrives to the fiber tip and thus less is collected as well.

Thus, the efficiency in coupling the readout light to the NSOM fiber tip and guiding it backwards to a remote detector depends on the cross section of the fiber's mode (the guided area) and its NA, as well as the Fresnel coefficient.

Fabricating the entire photodetector on the tip (i.e., light collection/detection structure including conversion into electric output) can have very large NA, much larger than the one of the fiber tip, while reaching a hemisphere and being equal to the one of the scatterer itself. The photodetector may be provided with antireflection coating which reduces the Fresnel coefficient R to zero and making Fresnel efficiency $\eta_{Fresnel}$ equal to 1, while in the fiber tip it is very difficult to fabricate an anti-reflecting coating on the small and not flat tip.

Thus, the main limit to the readout efficiency in the photodetector which is based upon direct light collection within the detector is related only to the area of the detector. In addition, since the detector senses only intensity and not the field (phase), the coupling efficiency is much less dependent on the relative angle and the relative orientation between the light collecting tip and the location on the sample from which the light is being collected.

Also, in the tip-photodetector of the present invention, the sensing is done directly on the evanescent waves (which are converted into electrons in the detector positioned at the edge of the tip), while in the back-guiding conventional NSOM fiber tip, the evanescent waves are to be the converted into guided modes being delivered to a remote detector positioned on the other side of the NSOM fiber. This conversion and delivery efficiency (guiding losses of the NSOM fiber) is also far from being 100% even if the areas and the angular range (NA) of the fiber tip are well matched to the scatterer.

It should be noted that the modes overlapping integral is defined as:

$$\eta = \frac{\left(\int\int \Phi_{tip}(x, y)\Phi_{eva\_mode} *(x, y)dxdy\right)^2}{(\int\int \Phi_{tip}(x, y)\Phi_{tip} *(x, y)dxdy)(\int\int \Phi_{eva\_mode}(x, y)\Phi_{eva\_mode} *(x, y)dxdy)} \quad (7)$$

where $\omega_{tip}(x, y)$ is the 2-D mode supported by the fiber tip and $\Phi_{eva\_mode}(x, y)$ is the 2-D evanescent mode propagated from the scatterer towards the fiber tip.

In the present invention, where the photodetector is fabricated on the surface of the tip, there is no need to couple light and no need to guide it back to a remote detector. Accordingly, the mode conversion efficiency is maximal and no guiding losses are exhibited.

As indicated above, the inventors have simulated the configuration and operation of the dual-mode AFM-NSOM detector, and also fabricated such device by processing the apex portion of the AFM tip.

The following is the description of pre-process simulations conducted by the inventors:

The numerical study of a photodetector device of the invention (similar to device 12 in FIG. 1A) was performed using the Comsol Multi-Physics software package [5], based on the Finite Elements Method (FEM) [6, 7]. The simulated device includes a silicon Schottky photodiode bearing a sub-wavelength top aperture [8]. Such a nanoscale electro-optical sensor, placed on an AFM cantilever's edge (apex of AFM tip), was intended to provide collection of the topography and the optical data. The electric response, while scanning a laser beam, was studied and optimized by changing the related specification. It was shown that high resolution of order of the detector's aperture is obtained. This is useful as a validation of the behavior of the device in comparison to current standards and benchmarks.

As a first step, the tip-photodetector has been simulated separately, and then as a second step, it has been combined to simulated standard silicon-based cantilever.

Figure 4A:
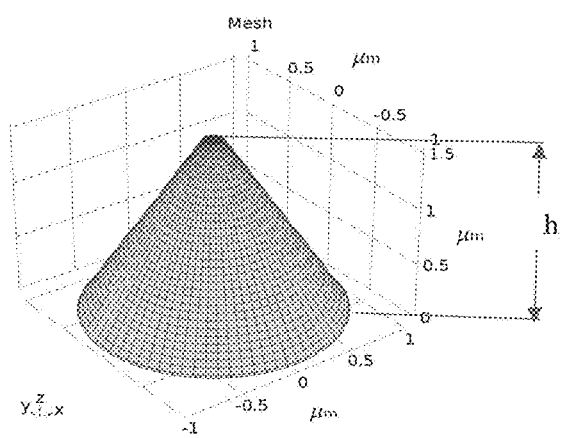
Figure 4B:
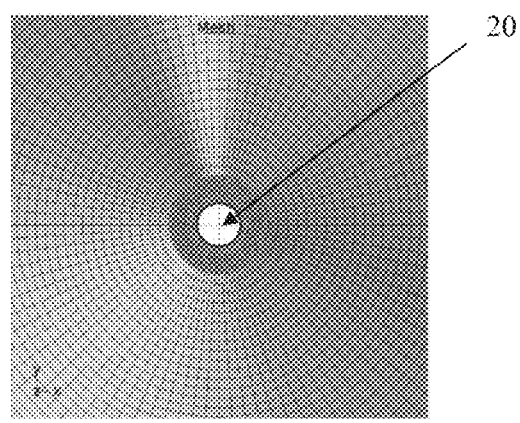
Figure 4C:
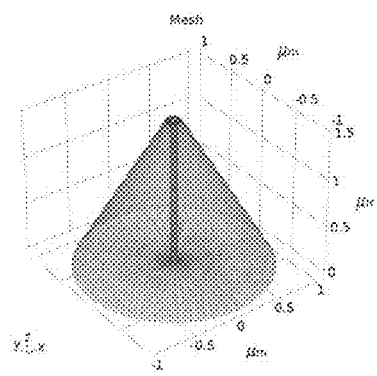
Figure 4D:
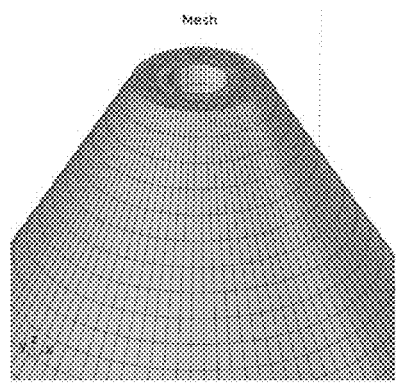
Figure 5A:
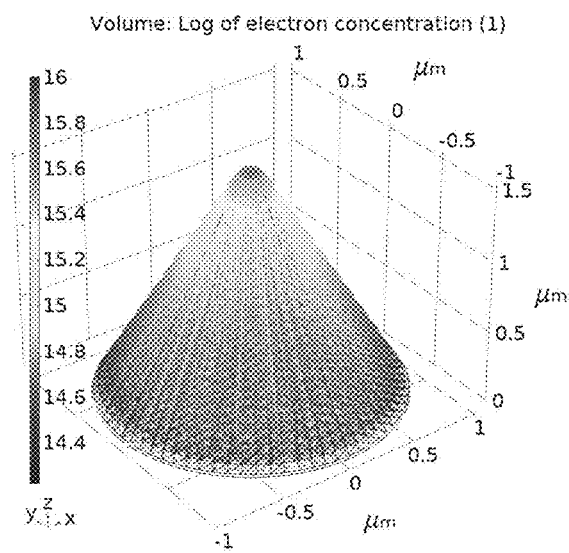
Figure 5B:
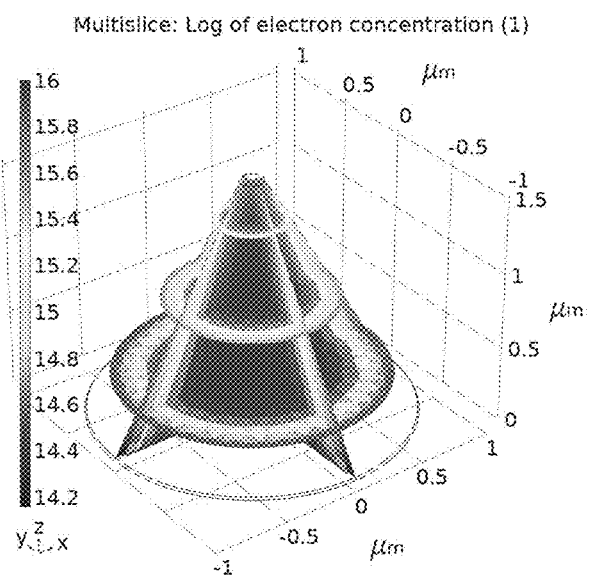

Reference is made to FIGS. 4a-4d and 5a-5b. FIGS. 4a-4d show comsol structure and mesh simulation results of the tip-photodetector for simulated regular mesh used for external contacts (FIG. 4a), simulated accurate mesh used for upper inside aperture (FIG. 4b), simulated accurate mesh used for internal drilled cylinder of the photodetector (FIG. 4c), and zoom-in of the aperture, sharing a diameter of 150 nm only less than the visible wavelength, and of the internal drilled cylinder (FIG. 4d). FIGS. 5a-5b show Comsol electrical simulation results of the tip-photodetector expressed by volume log of the electron concentration [$cm^{-3}$ units]—FIG. 5a, and multi-slice log of the electron concentration [$cm^{-3}$ units]—FIG. 5b.

As shown in FIGS. 4a-4d and 5a-5b, the NSOM is a 3D structure embedding a truncated conical-shaped photodetector device. The main parameters of this structure are: height h (e.g., of 1.6 µm), radius $r_t$ of top/apex side (e.g., 75 nm), and radius $r_b$ of bottom side (e.g. less than 1 µm). For simulation considerations, such as mesh complexity and run time, the height of 1.6 µm considered here is 1/10 of the real AFM silicon tip height.

FIGS. 5a-5b presents Comsol electrical preliminary simulation results using the semiconductor module. This pre-functionality simulation was performed under the following conditions: equilibrium (300K) and reverse bias of 0.5V applied at the upper half part the tip as a Schottky contact and ground at the bottom as an Ohmic contact, n doping is $10^{16}$ $cm^{-3}$, and the work function is 4.72 eV (Al).

One of the main advantages of the AFM-NSOM dual-mode photodetector device is the fact that the fabrication process may be quite simple, short (a couple of hours overall), and can start from a commercial AFM Silicon tip.

FIG. 6 shows a table exemplifying a flow diagram of the process of integrating an NSOM detector structure within the apex region of an AFM tip, i.e., fabrication of the processed tip. The process includes the following steps:

Providing (e.g. preparing) standard commercial AFM silicon-based cantilever-and-tip structure ($n^+$ type, As<$10^{17}$ $cm^{-3}$) [9], Performing Atomic Layer Deposition (ALD) of a passivation layer 24 ($Al_2O_3$, 50 nm thick), Sputtering deposition of reflective and conductive layer (Al, 200 nm thick), Applying FIB processing including: ablation of the tip to get the initial silicon aperture size (100 nm diameter), in-situ FIB deposition of platinum thick opaque layer 26 (of 100 nm), and in-situ FIB drilling to define the final Silicon aperture (<100 nm diameter).

As indicated above, the coatings are applied only to a part of the tip periphery to avoid electronic shortage.

In this example, the fabrication of the detector device of the present invention is implemented by processing a commercial (standard) AFM cantilever-and-tip assembly.

It should, however, be understood that the principles of the invention are not limited to this specific implementation.

Figure 7A:
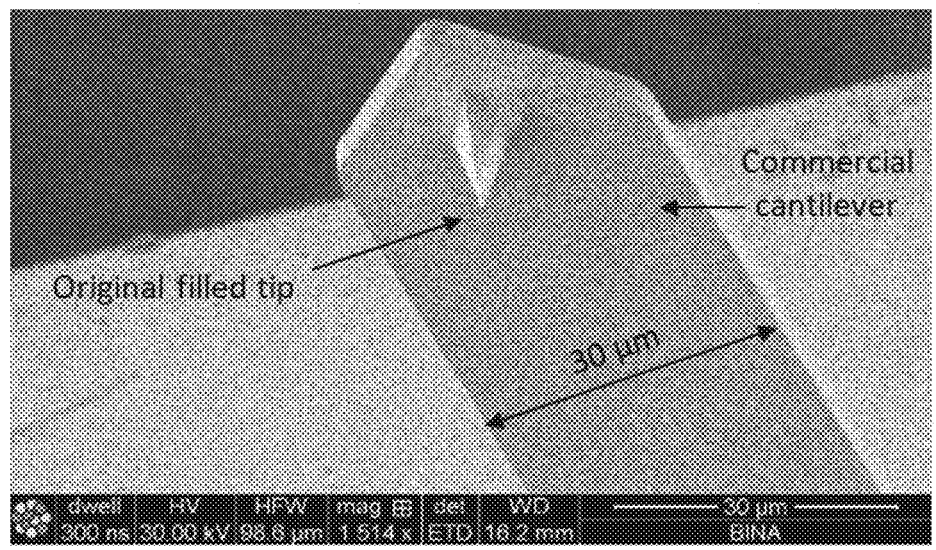
Figure 7B:
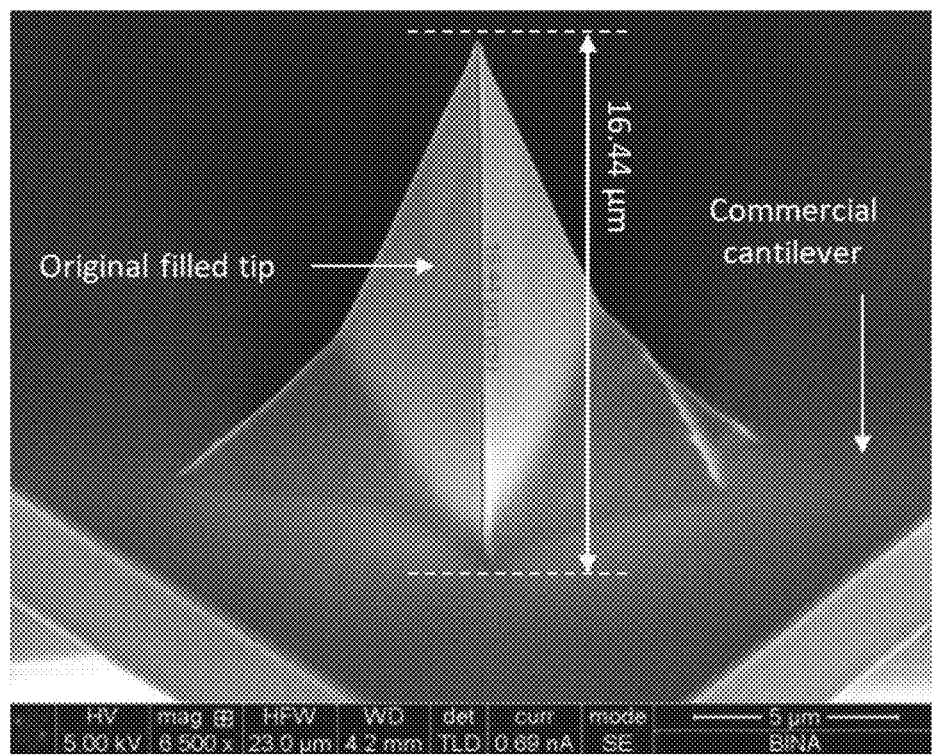

The profile and the dimensions of the commercial cantilever and of the commercial tip are respectively presented in FIGS. 7a and 7b, where FIG. 7a shows down side view of the cantilever and of the tip, and FIG. 7b shows up side and close-up view of the processed tip.

In the present not limiting example, the Focused Ion Beam (FIB) steps—tip ablation, platinum deposition, and tip drilling—have been processed using the FEI Helios 600 system, which is a dual beam instrument combining Scanning Electron Microscope (SEM) and FIB technologies as well as gas chemistries, different detectors and manipulators.

Figure 8A:
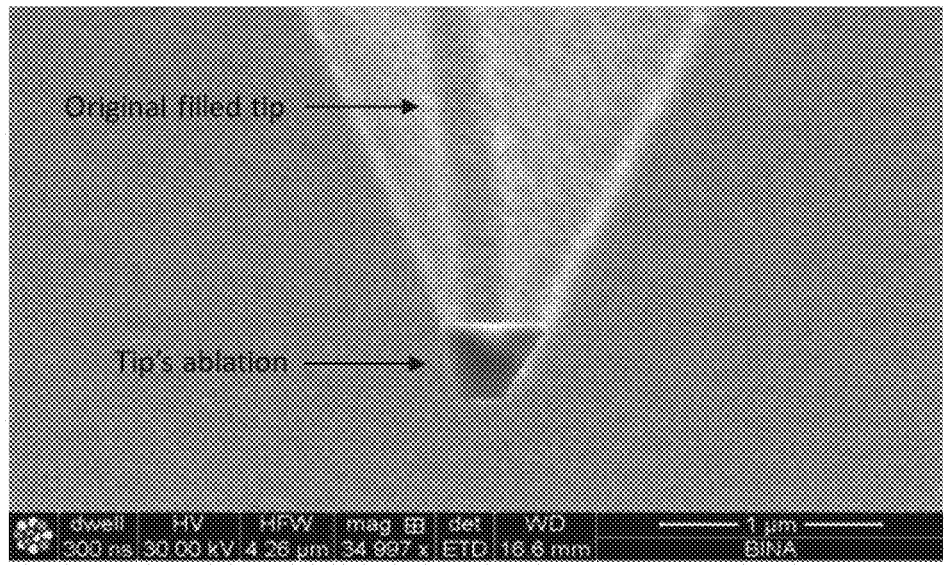
Figure 8B:
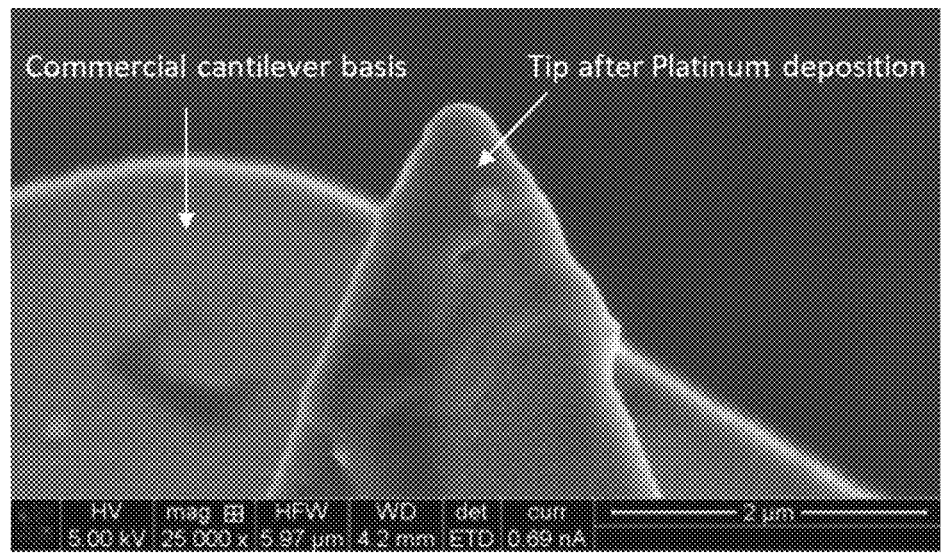

The tip ablation was performed under the following conditions: The tip was cut with a Ga+ ion beam current of 2.7 nA, accelerated by a voltage of 2 kV fixed on the FIB device. FIG. 8a shows the SEM view of the tip area using the FIB system after tip's ablation. The platinum from vapor precursor has been deposited by the Ga+ ion beam on the top of the probe. FIG. 8b shows the SEM view of the tip area using the FIB system after Platinum deposition.

The final step was drilling the aperture hole of the detector. It was performed with Ga+ ions beam (9.7 pA, 30 kV). The depth of the drilling was 400 nm through the Platinum layer, and a conical hole was obtained.

Regarding the FIB choice, it should be noted that there are two types of FIB: the first one uses Ga+ ions when the second one uses He ions. For such process, the use of Ga+ ions is preferred, since the He is not strong enough to enable a truncated tip. It is known that during FIB machining Ga+ ions are implanted into the Si structure. These implants can also be located in the critical area where there is a need to detect a photocurrent. Such a situation can influence the SNR. Moreover, when compared to regular ions' implantation process, there is no annealing step or any thermal post-recovery process after the drilling stage. Ga+ ions might cause a degradation of the initial silicon crystalline structure, and as a consequence, might affect the electro-optics measurements. The quality of the electrode as well as the quality of the Schottky contact, were checked and found very good. The above-described process (illustrated in the Table of FIG. 4) is also reproducible.

Figure 9A:
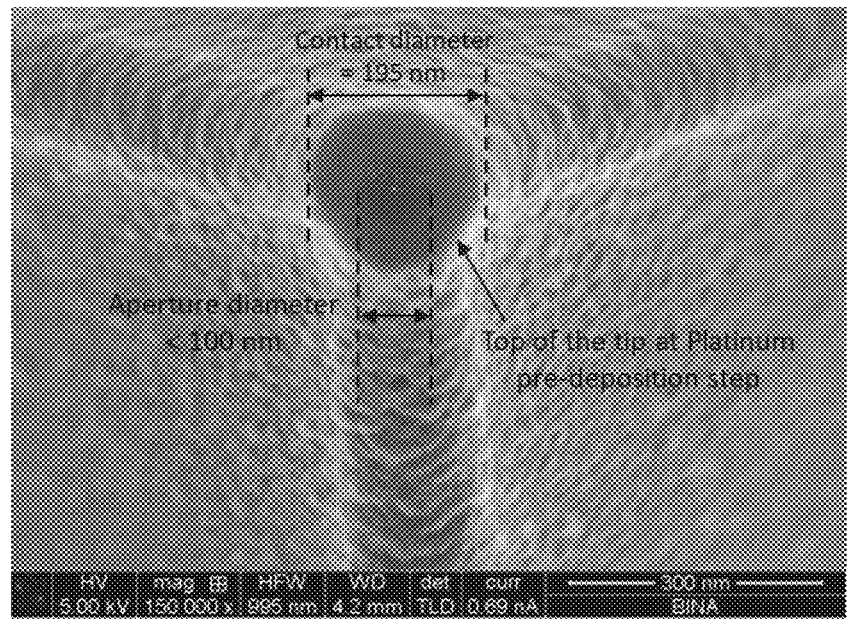
Figure 9B:
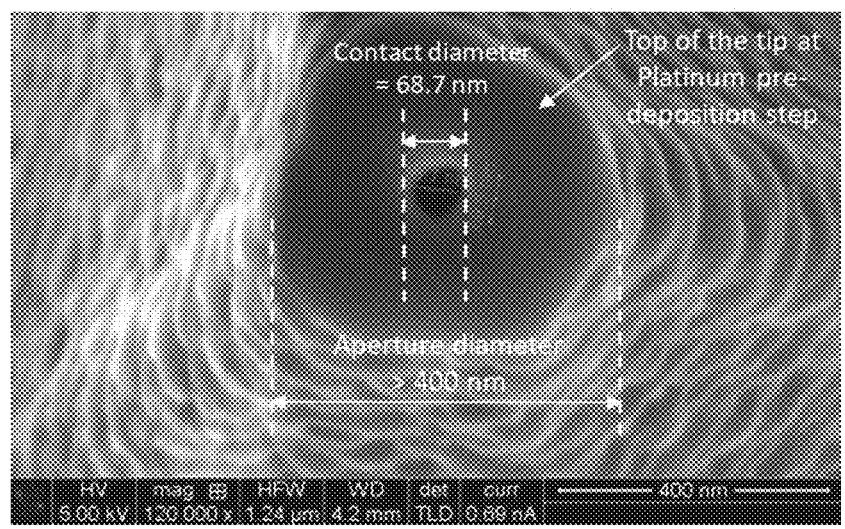

Reference is made to FIGS. 9a and 9b, showing processing of a series of three tips, when varying the diameters in a range of tens of nanometers. The figures show SEM pictures of two AFM tips after drilling, where FIG. 9a shows pre-Platinum deposition view of a tip contact diameter of 195 nm and aperture diameter of 100 nm, and FIG. 9b shows the post-Platinum deposition view of a tip contact diameter of ~400 nm and aperture diameter of 68.7 nm.

Regarding the drilling of the ablated tip using FIB system the parameters that are to be set include: the diameter of the drilled aperture (it varied from 68.7 nm (FIG. 9a) to 49.8 nm (FIG. 9b)); and the contact surface and/or contact diameter. This is because the AFM capability of scanning can be conserved even if the NSOM capability of light collection is added. Standard contact radius of AFM tip is less than 10 nm [9]. In the first experiences, the obtained contact diameter of the tip was about 400 nm (FIG. 9a). Further experiences and ameliorations enabled a reduced contact diameter of 200 nm (FIG. 9b), and less than 195 nm (not shown here), which means ten times larger than the commercial tip's contact diameter. The inventors have shown that in spite of the larger contact diameter, such tip properly functions as an AFM scanning tip.

After the processing step, the AFM functionality of the processed tip was checked. To this end, a calibration sample was used, sharing a periodical structure made of gold rectangular wells of 10 μm pitch and 180 nm step depth. A scan was performed using reference (initial non-processed) tip and compared with the processed tip of the probe. The check was aimed at demonstrating that the tip resonance was not dramatically modified by the process, and the scan of the calibration sample was similar for that of the two tips.

Figure 10:
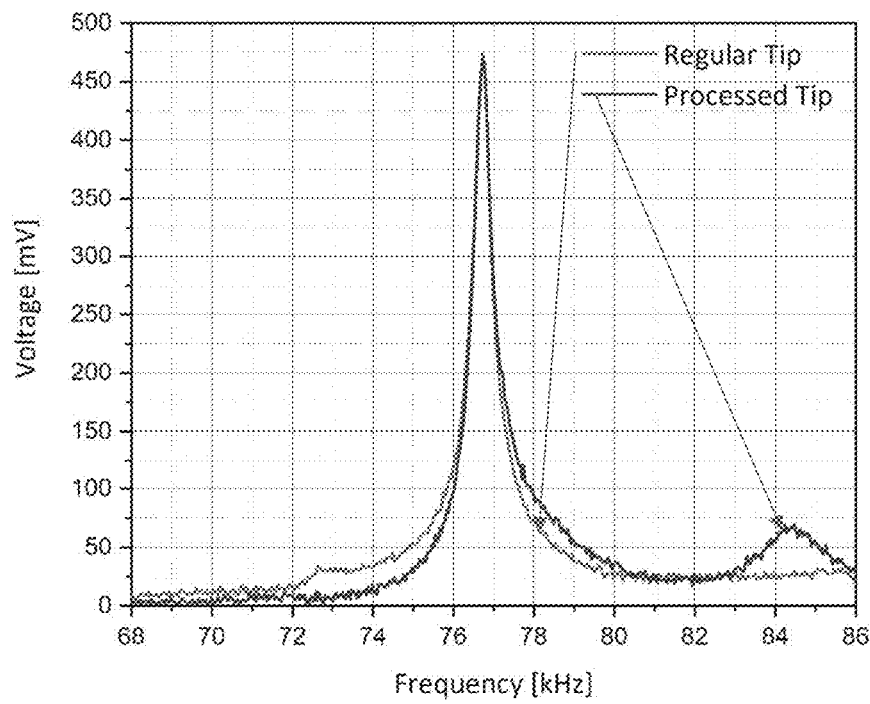
FIG. 10 shows piezo electric resonance curves of the regular and processed tips as a function of the excitation frequency of the AFM system, FIG. 11 compares the AFM scans of the calibration sample for reference tip and the processed tip.
Figure 11:
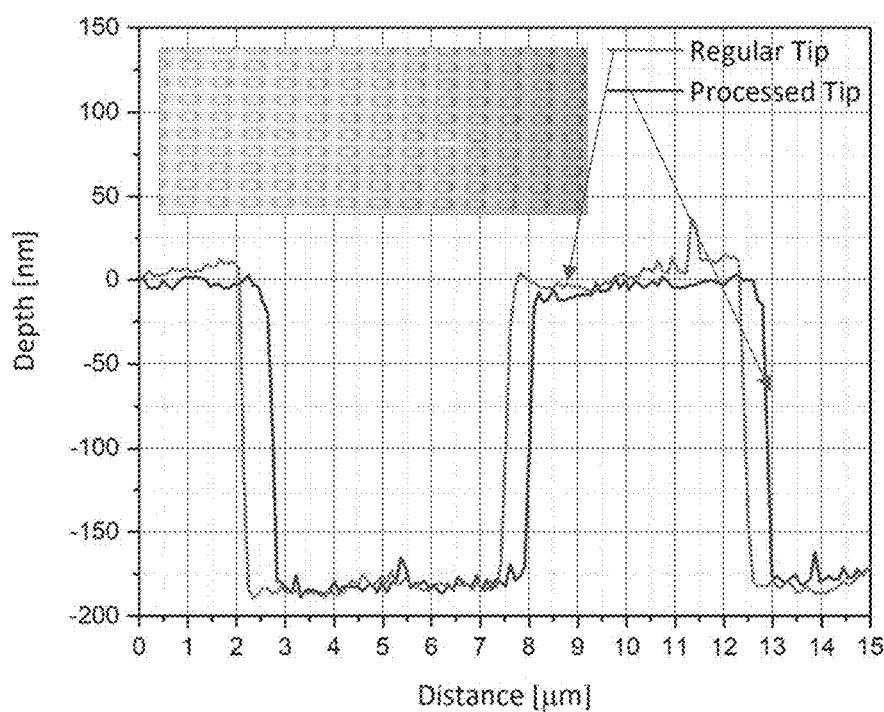

In this connection, reference is made to FIGS. 10 and 11, where FIG. 10 presents piezo electric resonance curves of the regular and processed tips as a function of the excitation frequency of the AFM system, and FIG. 11 presents comparison of the AFM scans of the calibration sample for reference tip and the processed tip. An insert image shows optical microscope view of the calibration sample to be scanned with the regular and processed AFM tip, demonstrating that the 10 μm pitch and 180 nm high structure is well resolved by both tips.

Indeed, the figures show that the same 2D X-Y resolution (in the scan plane) and Z-resolution was obtained despite the over-weight of the new probe (i.e., modified cantilever-and-tip structure). Usually, regular tip's response to the AFM piezo-electric system is occurring at some resonance frequency, enabling controlled movements. Such kind of response was obtained for a reference tip and is presented in FIG. 10. After identifying a correct resonance, the obtained scanning was successful, and a steps' function of the sample has been obtained and shown in FIG. 11. Horizontal and vertical accuracies are function of the tip's geometry.

Also, considering the accuracy of the AFM scanning measurements to be performed with processed vs. regular tips, the inventors conducted the grating test. This check included a sample made of an array of very sharp silicon tips [9]. The grating itself was built on a silicon wafer top surface, and the tips were very sharp. The test grating was intended for a 3D visualization of the scanning tip, serving as a mirror. Also, the test enables the determination of tip sharpness parameters (aspect ratio), tip degradation and contamination control.

Figure 12A:
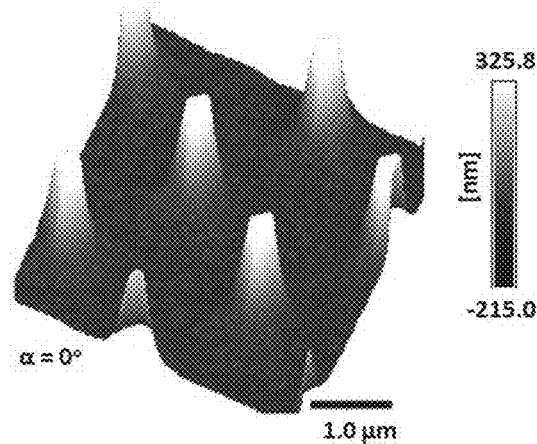
Figure 12B:
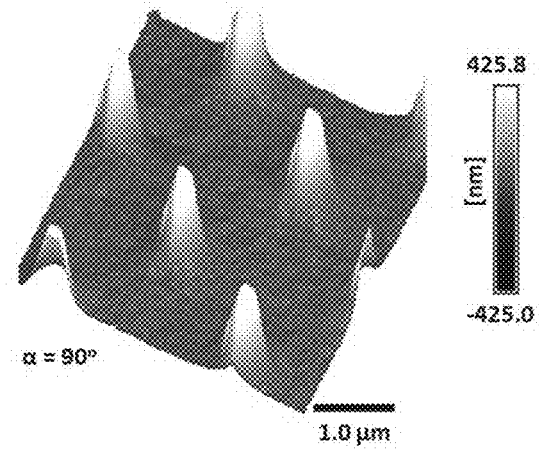
Figure 12C:
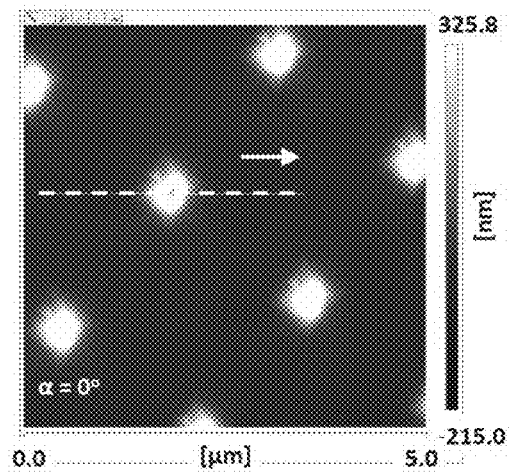
Figure 12D:
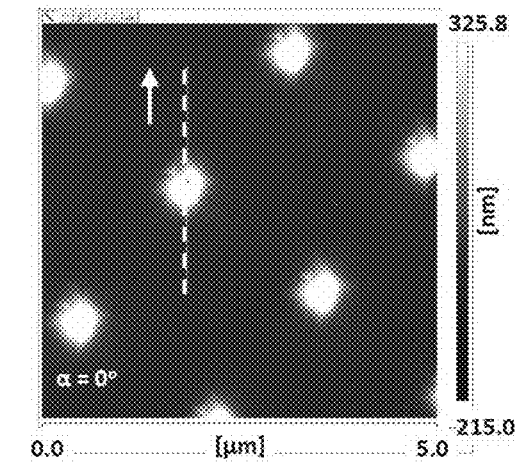
Figure 12E:
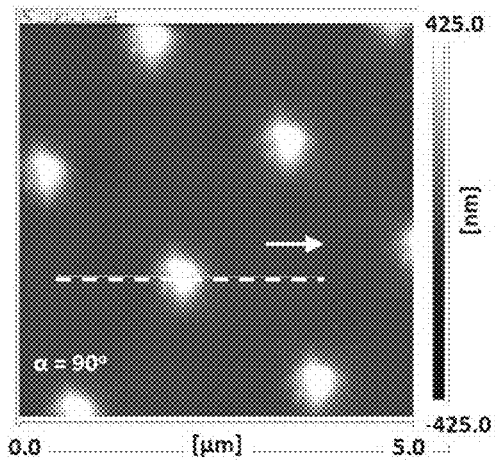
Figure 12F:
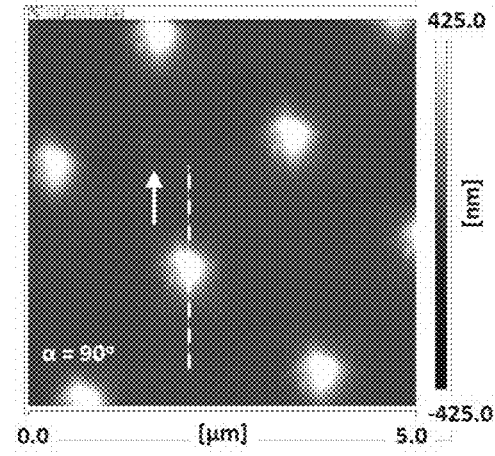
Figure 13A:
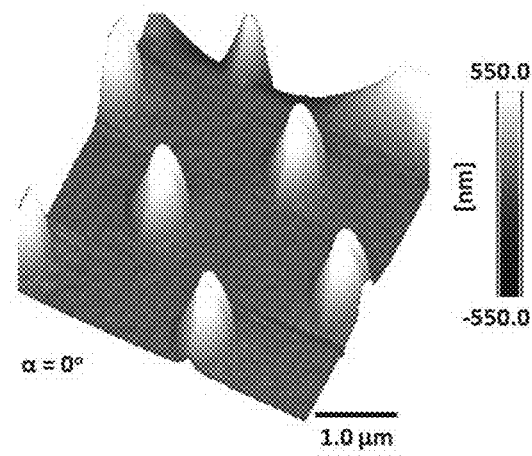
Figure 13B:
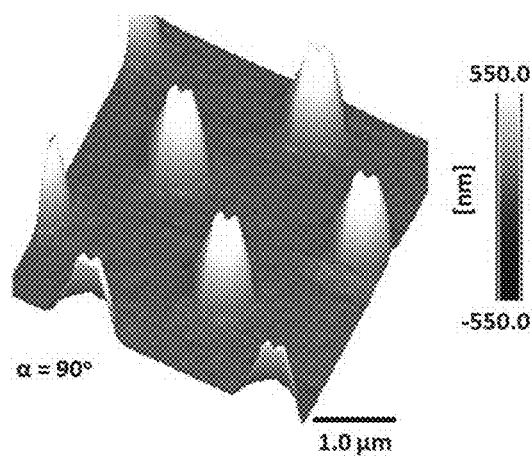
Figure 13C:
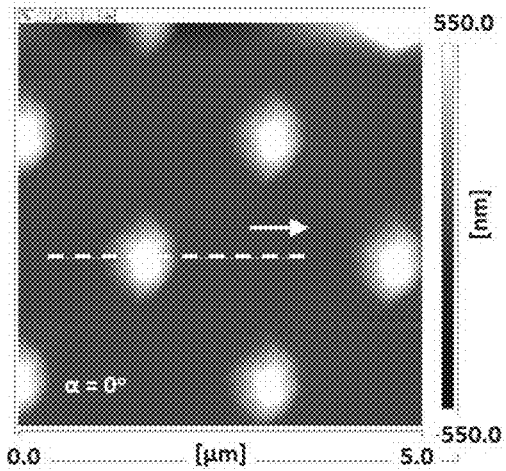
Figure 13D:
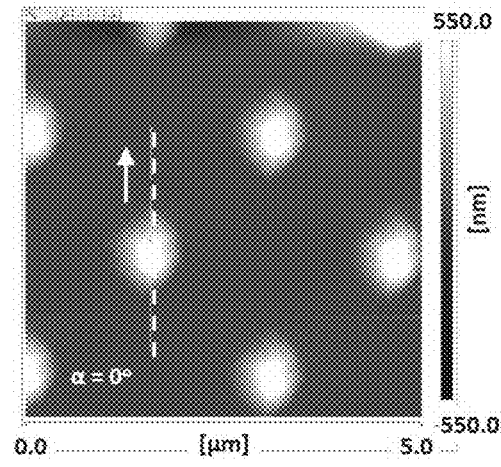
Figure 13E:
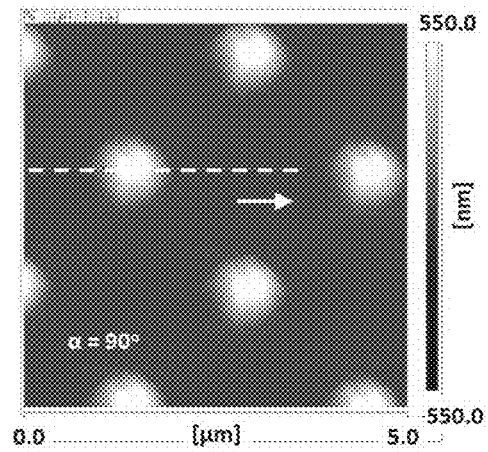
Figure 13F:
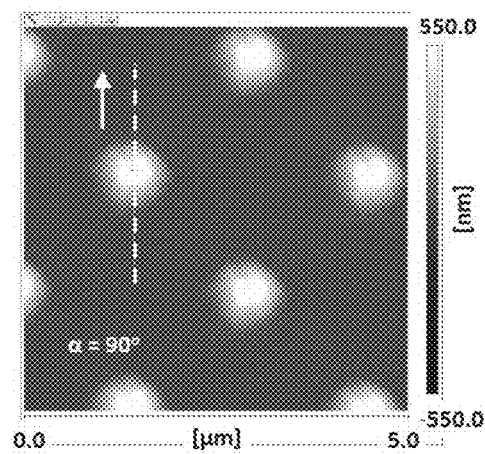

Reference is made to FIGS. 12a-12f and 13a-13f illustrating advanced AFM scans of nano Si tips using, respectively, regular AFM tip and processed tip (tip-photodetector of the present invention). FIGS. 12a and 13a show pre-scan sample at α=0°; FIGS. 12b and 13b show pre-scan sample rotated at α=90°, FIGS. 10c and 11c show horizontal scan view at α=0°, FIGS. 12d and 13d illustrate vertical scan views at α=0°, FIGS. 12e and 13e illustrate horizontal scan views at α=90°, and FIGS. 102 and 13f illustrate vertical scan views at α=90°.

Thus, both the regular AFM tip (FIGS. 12a-12f) and the processed tip (FIGS. 13a-13f) have been used to scan the array in complementary tests. The regular tip was checked in horizontal (FIGS. 12c and 12e) and vertical (FIGS. 12d and 12f) directions, when changing also the angle of the scanning from α=0° (FIGS. 12c and 12d) to α=90° (FIGS. 12e and 12f). Similar checks of scanning were respectively performed for the processed tip in horizontal (FIGS. 13c and 13e) and vertical (FIGS. 13d and 13f) directions, when changing also the angle of the scanning from α=0° (FIGS. 13c and 13d) to α=90° (FIGS. 13e and 13f).

Figure 14:
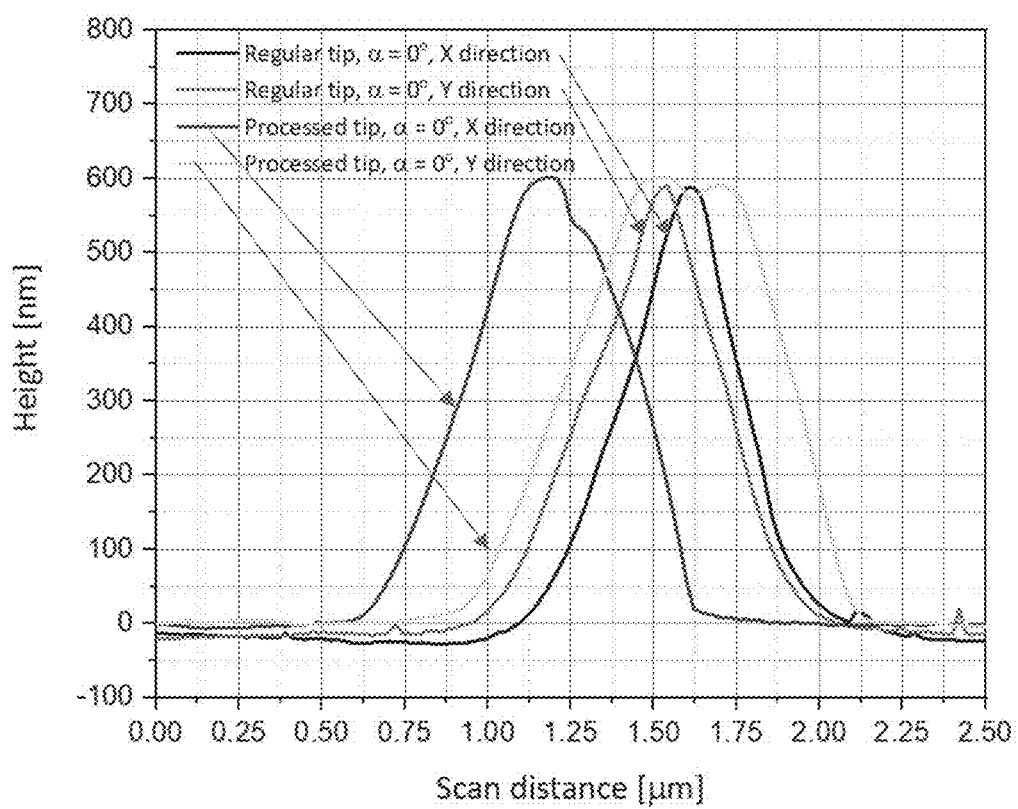
FIGS. 14 and 15 illustrate the comparison between the regular tip and the processed tip of the present invention by scanning curves for α=0° (FIG. 14) and α=90° (FIG. 15).
Figure 15:
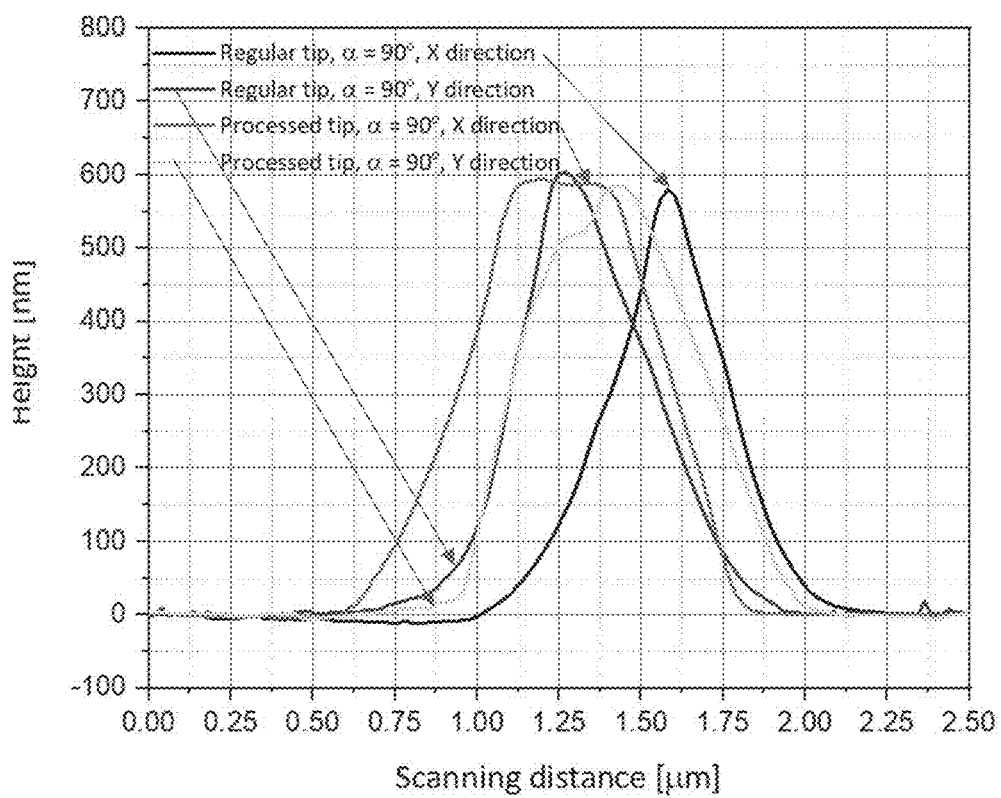

The AFM views described above are also presented as scanning curves of α=0° (FIG. 14) and α=90° (FIG. 15). As can be seen, the height of the measured tips is well conserved in all cases, and there is almost no difference between regular and processed tips. The difference occurs in the scanning distance, when the width of the measured peaks is larger and shifted in the case of measurement using a processed tip. Some of the measurements present also a well-known phenomenon of multiple-tips [10, 11], which in the configuration of the present invention is a double-tip profile due to the drilled structure of the device.

The invention claimed is:

1. A detector device for use in a surface probing system, the detector device comprising an integral semiconductor structure configured to define a cantilever and tip probe assembly, comprising at least one tip formed on the cantilever, wherein an apex portion of said at least one tip, by which the probe assembly scans a surface being probed, is configured as an apertured photodetector comprising a layered structure formed with an aperture of subwavelength dimensions and defining at least one depletion region and an electrical circuit, said subwavelength aperture allowing collection of evanescent waves created at a surface region in response to external illumination and interaction of collected evanescent waves with the at least one depletion region thereby causing direct conversion of the collected evanescent waves into electric signals being read by the electrical circuit within said apex portion of the tip, said integral semiconductor structure being thereby configured and operable for concurrently monitoring topographic and optical properties of the surface being scanned by said apex portion of the tip.

2. The detector device according to claim 1, wherein the electric circuit comprises electric contact layers extending from the apex portion of the tip along a surface of the cantilever and tip probe assembly to be received at a signal detector.

3. The detector device according to claim 2, wherein the layered structure is configured as a metal-oxide-semiconductor (MOS) structure, defining at least one MOS unit, and an electrical contact layer.

4. The detector device according to claim 2, wherein said apertured photodetector is fabricated at the apex portion of the tip made of semiconductor material, by applying the following processing of the tip:
performing Atomic Layer Deposition of a passivation layer on a portion of said apex region of the tip,
depositing by sputtering reflective and conductive layer on said passivation layer,
applying FIB processing to said portion of the apex region of the tip to deposit electrically conductive opaque layer and form the aperture in the semiconductor material of the tip.

5. The detector device according to claim 4, wherein: said semiconductor material of the tip is silicon; the passivation layer is $Al_2O_3$; the reflective and conductive layer is Al; and the electrically conductive opaque layer is platinum.

6. The detector device according to claim 5, wherein: said passivation layer $Al_2O_3$ has a thickness of about 50 nm; said reflective and conductive layer Al has a thickness of about 200 nm; and the platinum opaque layer has a thickness of about 100 nm.

7. The detector device according to claim 6, wherein the apertures has a dimension less than 100 nm.

8. The detector device according to claim 4, wherein said FIB processing comprises: ablation of the tip to form an initial silicon aperture size of 100 nm, followed by the deposition of the platinum opaque layer; and drilling to define the silicon aperture of a dimension less than 100 nm.

9. The detector device according to claim 1, wherein said cantilever and tip probe assembly comprises at least one additional tip on said cantilever.

10. The detector device according to claim 9, wherein said at least one additional tip on said cantilever is configured for monitoring topographic properties of the surface being scanned.

11. The detector device according to claim 9, wherein apex regions of at least two tips on the cantilever comprise apertured photodetectors configured to collect and detect different wavelengths, respectively, the detector device being thereby having spectrometer functionality.

12. The detector device according to claim 1, wherein the aperture has elongated geometry and is operable as a polarizer.

13. The detector device according to claim 1, wherein the cantilever and tip assembly is configured to detect different polarization components of the evanescent waves being collected, the detector device thereby having a polarimeter functionality.

14. The device according to claim 13, wherein the layered structure of the photodetector at the apex region of the tip comprises a patterned electrically conductive layer defining four spaced-apart electrically conductive segments, thereby forming four depletion regions for polarized detection and four electric signal read channels, thereby enabling measurement of angles of rotation of polarized illuminating light caused by interaction with the surface being scanned.

15. An AFM-NSOM dual-mode detector device comprising: an integral semiconductor structure configured to define a cantilever and tip assembly comprising at least one tip configured and operable as an AFM probe for monitoring topography properties of a surface being scanned by the tip, wherein an apex portion of said at least one tip is configured as an apertured photodetector having a metal-oxide-semiconductor layered structure formed with an aperture of a subwavelength dimensions adapted to collect evanescent waves created at a surface region in response to external illumination and directly convert collected evanescent waves into electric signals being read by an electrical circuit within the apex portion of the tip, said apex region of the tip being thereby configured and operable as an NSOM probe, while maintaining the cantilever and tip assembly operation as the AFM probe.

16. A surface probing system comprising the detector device of claim 1.

17. A surface probing system comprising the AFM-NSOM dual-mode detection system of claim 15.

18. A surface probing system comprising:
a light source unit configured and operable to produce pulsed illumination on a surface being scanned,
a detector device comprising an integral semiconductor structure configured to define a cantilever and tip probe assembly, comprising at least one tip formed on the cantilever, wherein an apex portion of said at least one tip is configured as an apertured photodetector comprising a metal-oxide-semiconductor layered structure formed with an aperture of subwavelength dimensions allowing collection of evanescent waves created at a surface region in response to the pulsed illumination and direct conversion of the collected evanescent waves into electric signals being read by an electrical circuit within said apex portion of the tip, said integral semiconductor structure being thereby configured and operable for concurrently monitoring topographic and optical properties of the surface being scanned by said apex portion of the tip.

19. A method for fabricating a detector device of claim 1, the method comprising:
providing the cantilever and tip probe assembly made of silicon material;
processing the apex region of the tip, to form said apertured photodetector, said processing comprising:
performing Atomic Layer Deposition of a passivation layer on a portion of said apex region of the tip, depositing reflective and conductive layer on said passivation layer, and applying FIB processing to said portion of the apex region of the tip to deposit electrically conductive opaque layer and form the aperture in the semiconductor material.

* * * * *